United States Patent Office 3,431,963
Patented Mar. 11, 1969

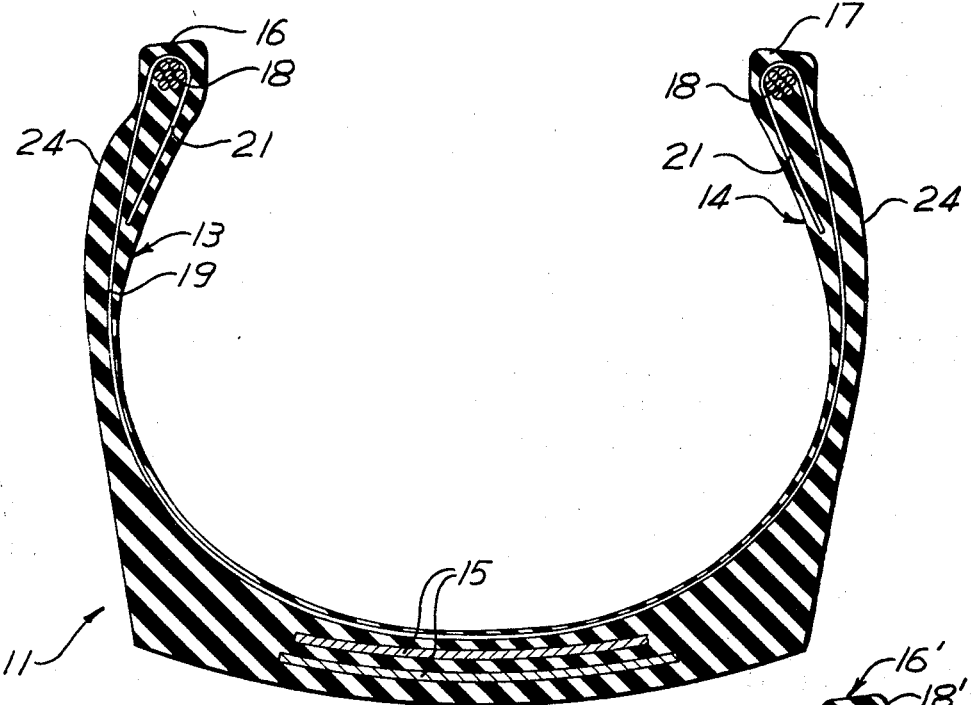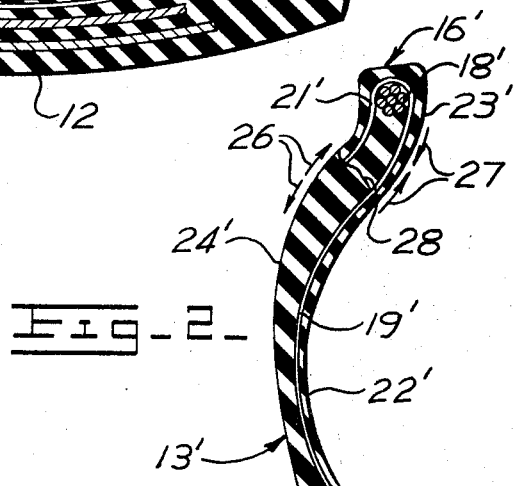

3,431,963
PLY CONFIGURATION FOR PNEUMATIC TIRES
Charles C. Sons, Jr., Peoria, Ill., assignor to Caterpillar Tractor Co., Peoria, Ill., a corporation of California
Filed July 25, 1966, Ser. No. 567,666
U.S. Cl. 152—356                                        1 Claim
Int. Cl. B60c 5/00, 9/00, 11/00

ABSTRACT OF THE DISCLOSURE

Radial plies in a tire have a configuration which reduces fatiguing and cutting of the tire material by the plies during stressing of the tire. The plies extend progressively closer to the outer surface of the sidewall in approaching the bead regions and have end portions which are doubled back at the beads and terminated at an inner portion of the sidewalls in a region of relatively low tensile stress. The configuration avoids a reversal of curvature of the plies near the beads which can contribute to tire failure.

---

This invention relates to vehicular tires and tire casings and more particularly to a ply arrangement therein which provides better protection against failure and greater durability.

The term tire as used herein and in the appended claims refers generically to both tire casings designed to receive an inner tube and to tubeless tires.

Substantial improvements in tire performance are obtained through the use of plies which may be formed of any of various metallic or non-metallic wires, cables, cords or synthetic fibers and which are embedded in the body of the tire to provide reinforcement. It is a well known practice in the art to provide plies which extend circumferentially around the tire within the tread region and it is also common practice to provide plies in the sidewalls which extend in a generally radial direction between the beads and the tread region.

While conventional radial plies very significantly increase the ability of the itre to withstand repeated radial flexing, sidewall failure is still commonly found to be a limiting factor to the useful life of the tire. Such failure frequently takes the form of cracking of the sidewall along a circular zone which is coaxial with the bead of the tire. The use of various measures for increasing tire life, such as providing greater tread depth, protective sheathings, etc. do not fully realize the intended results unless the problem of sidewall cracking, which is particularly pronounced in single ply tires, is solved.

Consideing now the present invention, I have observed that sidewall cracking of the type described above tends to occur at a radius of the tire which more or less coincides with that of the ends of the radial plies embedded therein and have discovered that the disposition of the ends of the plies is causally related to such cracking.

In particular, it has been the practice to loop the ends of each radial ply around the bead wire at each side of the tire with a short end portion of the ply being thus doubled back within the tire sidewall near the outer surface thereof. This short end portion of the ply not only fails to contribute any substantial reinforcement but appears in fact to produce fatiguing of the surrounding material, which may be accompanied by a kind of cutting action at the sharp end, which contributes to eventual cracking of the tire along the line of the ends of the plies. This action is aggravated by the fact that the tire material in the immediate region of the ends of such plies is in tension during flexing of the tire and thus is particularly vulnerable to cutting and fatiguing.

An additional factor which appears to contribute to the sidewall failure is the pronounced double curvature of the ply in the region of the sidewall which is subject to the cracking described above during flexing of the tire and which results from the conventional practice of doubling the ply back around the inside of the bead wire. This curvature produces a lateral and longitudinal motion in the ply during flexing of the tire which may cause it to further stress the surrounding tire material.

The problem is alleviated by the present invention by situating the short end portion of the ply near the inner surface of the tire sidewall rather than near the outer surface as in the conventional construction. This may be done by looping the end portions of the plies around the bead wires in a reverse sense from that which has heretofore been the practice. This puts the main portion of the ply nearer the outer surface of the sidewall where maximum tension occurs and puts the end portion in a region where there is relatively less tensile stress or which may even be in compression. In addition, the described double curvature of the ply is reduced or eliminated.

Accordingly it is an object of this invention to increase the reliability and durability of pneumatic tires.

It is another object of the invention to forestall sidewall failure in pneumatic tires.

It is still another object of the invention to provide a generally radial ply configuration for a pneumatic tire which alleviates the deleterious effects of such plies on the tire material.

It is a further object of the invention to render single ply tires more suitable for heavy duty applications by preventing a heretofore common cause of cracking in such tires.

The invention, together with further objects and advantages thereof, will be better understood by reference to the following specification taken together with the accompanying drawings, of which:

FIGURE 1 is a cross section view of a single ply pneumatic tire embodying the invention;

FIGURE 2 is a partial cross section view of a conventional single ply tire during flexing thereof showing the forces present in certain regions of the sidewalls thereof and illustrating a kind of circumferential cracking which frequently occurs therein; and FIGURE 3 is a partial cross section view of the tire of FIGURE 1 during flexing thereof showing the disposition of the plies relative to stressed regions of the tire sidewalls in the present invention.

Referring now to the drawing and more particularly to FIGURE 1 thereof, the tire 11 may have a conventional configuration insofar as external characteristics are concerned and thus includes an annular tread region 12, having circumferential plies 15, and a pair of sidewalls 13 and 14 extending to a pair of annular bead regions 16 and 17 respectively, the tread region and the sidewalls having a slight outward bow when the tire is unstressed. Tread 12, sidewalls 13 and 14 and beads 16 and 17 are formed of a resilient material such as rubber, by techniques known to the art, as an integral unit. Bead wires, which in this instance are cables 18, are embedded within the beads 16 and 17 to provide reinforcement therein.

In use, the tire 11 is repeatedly flexed by a variety of forces such as those which tend to compress the beads 16 and 17 towards the tread 12 thereby causing the sidewalls 13 and 14 to bow outward with a still greater curvature. To strengthen the tire 11 and to aid in resisting the resulting stresses, radial plies 19 are embedded within the tire at spaced intervals therearound.

Each such ply 19, which is a steel wire in this instance, extends from a first bead region 16 through the adjacent sidewall 13, through the tread region 12 and other sidewall 14, to the second bead 17, in a smooth curve. To anchor the ends of the plies 19, a short end portion 21 thereof is looped around the bead wire 18 in each of the beads 16 and 17 and extends back within the adjacent sidewall 13 and 14 for a short distance.

In the manufacture of tires of this general type, it has heretofore been the practice to loop the plies around the bead wires in a rotational sense which situates the ends of the plies outward from the adjoining portion thereof. Thus, as shown in FIGURE 2 which illustrates the conventional configuration, the ply 19' has extended through the sidewall 13' and bead 16' in close proximity to the inner surfaces 22' and 23' thereof with the end portion 21' of the ply being turned outwardly around the bead wire 18' and extended back a short distance within the sidewall in close proximity to the outer surface 24' thereof.

The above described conventional disposition of the plies 19' leaves the end of the ply at a particular region of the tire sidewall 13' which is subject to very large tension force during flexing of the tire as indicated by arrows 26 in FIGURE 2. The adjacent region of the sidewall 13' which is closer to the inner sidewall surface 22' is subject to much less tensile force or may under certain conditions be in compression as indicated by arrows 27. Circumferential cracks 28 tend to occur in the region of the sidewall under discussion, i.e. adjacent to the ends of the plies 19'. As hereinbefore discussed, this appears to result at least in part from effects of the ends of the plies 19' on the adjacent tensioned tire material, such as cutting, fatiguing and the like, and from stress concentration resulting from the pronounced curvature of the plies in the region immediately inward from the ends thereof. These effects are particularly severe where small diameter metal wires are used for plies as in the present example.

Referring now again to FIGURE 1, the ply 19 in the present invention is wrapped around the bead wires 18 in a reverse sense and such configuration substantially reduces the occurrence of sidewall cracking. In particular, the plies 19 become progressively closer to the outer surfaces 24 of the sidewalls 13 and 14 as the beads 16 and 17 are approached. The end portions 21 of the plies 19 then turn inwardly around the bead wires 18 and extend back within the sidewalls for a short distance in proximity to the inner surfaces 22 thereof.

Referring now to FIGURE 3 which shows the tire 11 of FIGURE 1 in a flexed state, it may be seen that the ply configuration of the present invention locates the end sections 21 of the plies away from the region of high tensile stress as indicated by arrows 26 and in a region of relatively low or even compressional stress as indicated by arrows 27. The configuration reduces or virtually eliminates curvature of the portion of the plies 19 which adjoins end sections 21 thereby reducing stress concentrations which may result from slack in the plies. Further, such configuration moves the plies 19 closer to the region of high tensile stress, indicated by arrows 26, in position to provide greater reinforcement.

What is claimed is:

1. Reinforcement for a pneumatic tire of the class having an annular tread region and a pair of annular beads of lesser diameter and a pair of sidewall regions extending between said tread regions and said beads and being integral therewith, comprising plies extending from a first of said beads to the second thereof through said sidewalls and said tread region, said plies having end portions which are doubled back in the region of said beads and terminated in the sidewalls away from the bead regions and with said end portions of the plies being closer to the inner surfaces of said sidewalls than the adjoining portions of said plies, wherein all portions of said plies between the doubled back ends and the tread region of the tire have centers of curvature at the inner side of the plies when the tire is unstressed whereby there is no reversal of curvature in said portions of the plies.

References Cited

UNITED STATES PATENTS

| 1,149,841 | 8/1915 | Latour et al. | 152—361 X |
| 1,855,560 | 4/1932 | Preyer | 152—355 |
| 2,493,614 | 1/1950 | Bourdon | 152—361 |
| 2,650,633 | 9/1953 | Eger | 152—354 |
| 3,166,113 | 1/1965 | Keefe | 152—361 |

FOREIGN PATENTS 672,455   3/1966   Belgium.

ARTHUR L. LA POINT, *Primary Examiner.*

C. M. LYON, *Assistant Examiner.*